(12) United States Patent
Fujiwara et al.

(10) Patent No.: US 9,700,069 B2
(45) Date of Patent: Jul. 11, 2017

(54) METHOD FOR FORMING IMPREGNATED FOOD

(71) Applicants: Seiichi Fujiwara, Sakado (JP); Yutaka Kuwano, Sakado (JP); Fumito Ichikawa, Tokyo (JP); Mitsuharu Kurosu, Sakado (JP)

(72) Inventors: Seiichi Fujiwara, Sakado (JP); Yutaka Kuwano, Sakado (JP); Fumito Ichikawa, Tokyo (JP); Mitsuharu Kurosu, Sakado (JP)

(73) Assignee: Meiji Co., Ltd., Tokyo (JP)

( * ) Notice: Subject to any disclaimer, the term of this patent is extended or adjusted under 35 U.S.C. 154(b) by 0 days.

(21) Appl. No.: 14/176,275

(22) Filed: Feb. 10, 2014

(65) Prior Publication Data

US 2014/0161948 A1    Jun. 12, 2014

Related U.S. Application Data

(62) Division of application No. 13/256,517, filed as application No. PCT/JP2010/055879 on Mar. 31, 2010, now abandoned.

(30) Foreign Application Priority Data

Mar. 31, 2009    (JP) .................. 2009-087254

(51) Int. Cl.
*A23G 1/54*     (2006.01)
*A23L 1/00*     (2006.01)
(Continued)

(52) U.S. Cl.
CPC ............ *A23L 1/0067* (2013.01); *A21C 15/00* (2013.01); *A21D 13/24* (2017.01); *A23G 1/48* (2013.01);
(Continued)

(58) Field of Classification Search
CPC ...................................... A23G 3/545
(Continued)

(56) References Cited

U.S. PATENT DOCUMENTS

| 3,894,159 A | 7/1975 | Franta | |
| 4,788,072 A * | 11/1988 | Kawamura | A23B 4/03 426/441 |
| 4,891,235 A * | 1/1990 | Mizuguchi | A23G 9/20 426/281 |

FOREIGN PATENT DOCUMENTS

| CN | 1227468 A | 9/1999 |
| CN | 1512839 A | 7/2004 |

(Continued)

OTHER PUBLICATIONS

International Preliminary Report on Patentability including the Written Opinion issued Nov. 15, 2011 for PCT/JP2010/055879.
International Search Report dated Jul. 6, 2010 for PCT/JP2010/055879.

*Primary Examiner* — Lien T Tran
(74) *Attorney, Agent, or Firm* — Sughrue Mion, PLLC

(57) ABSTRACT

An impregnated food in which a solid edible material is impregnated with a liquid food having a viscosity of 10,000 to 100,000 mPa·s at 35° C. has a good taste of the liquid food, has nevertheless a not hard texture, and achieves a sense of unity between the solid edible material and the liquid food. The impregnated food can be produced by a process for producing an impregnated food, wherein in a hermetically closed system, the system is pressurized in a state where a solid edible material is made contact with a liquid food, and then, the pressure in the system is returned to the atmospheric pressure.

15 Claims, 5 Drawing Sheets

(51) Int. Cl.

| | | |
|---|---|---|
| *A21C 15/00* | (2006.01) | |
| *A23G 1/48* | (2006.01) | |
| *A23G 3/34* | (2006.01) | |
| *A23G 3/48* | (2006.01) | |
| *A23G 3/54* | (2006.01) | |
| *A23P 20/17* | (2016.01) | |
| *A23P 20/20* | (2016.01) | |
| *A23P 30/10* | (2016.01) | |
| *A21D 13/24* | (2017.01) | |

(52) U.S. Cl.
CPC .............. *A23G 1/54* (2013.01); *A23G 3/0063* (2013.01); *A23G 3/0082* (2013.01); *A23G 3/0093* (2013.01); *A23G 3/48* (2013.01); *A23G 3/54* (2013.01); *A23P 20/17* (2016.08); *A23P 20/20* (2016.08); *A23P 30/10* (2016.08)

(58) Field of Classification Search
USPC ........................................ 426/281, 282, 283
See application file for complete search history.

(56) References Cited

FOREIGN PATENT DOCUMENTS

| | | | |
|---|---|---|---|
| JP | 6-169706 A | | 6/1994 |
| JP | 7-31366 A | | 2/1995 |
| JP | 10-150917 A | | 6/1998 |
| JP | H11-89515 A | | 4/1999 |
| JP | 2001-238612 A | | 9/2001 |
| JP | 2004-194549 A | | 7/2004 |
| JP | 2004-254529 A | | 9/2004 |
| JP | 2004-267116 A | | 9/2004 |
| JP | 2004254529 | * | 9/2004 |
| JP | 2005-168394 A | | 6/2005 |
| JP | 2008-5745 A | | 1/2008 |
| JP | 2008-237102 A | | 10/2008 |
| JP | 2009-072086 A | | 4/2009 |
| WO | 9747207 A1 | | 12/1997 |

* cited by examiner

METHOD FOR FORMING IMPREGNATED FOOD

PRIORITY INFORMATION

This is a Divisional of U.S. Ser. No. 13/256,517 filed on Nov. 28, 2011 Now Abandon, which is a 371 of PCT/JP2010/055879 filed Mar. 31, 2010 and which claims priority to Japanese Patent Application No. 2009-087254, filed Mar. 31, 2009. The disclosure of each of the above prior applications is considered part of and is incorporated herein by reference in their entirety.

TECHNICAL FIELD

The present invention relates to a food in which a porous solid edible material is impregnated with a liquid food and which moderately has voids therein, and to a process for producing the same.

BACKGROUND ART

An impregnated food obtained by bringing a porous solid edible material, such as a baked confectionery, a dried food, a freeze-dried food of meat, vegetable, fruit, etc. into contact with a liquid food before or after a pressure reduction treatment or under a condition of a reduced pressure so as to impregnate the food with the liquid food, and process for producing the same have been proposed (Patent Literatures 1 to 3). By these processes, however, in a case where, for example, a thick solid edible material is impregnated with a liquid food which solidifies at room temperature, voids of the edible material are filled with the solidified liquid food, and the texture thereof becomes very hard, which is unfavorable in some occasions. To cope with this, if the impregnation is carried out at a less reduced pressure, the liquid food penetrates only to shallow zones in the solid edible material without reaching a central part thereof, thereby resulting in that a sense of unity between the solid edible material and the liquid food is impaired.

Furthermore, an impregnated food in which a porous solid edible material is impregnated with a liquid food by a first pressure reduction treatment, and then another pressure reduction treatment is carried out without immersing the solid edible material in the liquid food, so that the liquid food can be impregnated deep into the solid edible material while the liquid food inside the solid edible material let out moderately and a process for producing the same have been disclosed (Patent Literature 4).

By this method, however, in a case where, for example, the viscosity of a liquid food is high, the liquid food may occasionally not be impregnated sufficiently into a solid edible material. Further, even if the liquid food has been able to be impregnated into the solid edible material by the first pressure reduction treatment, a sufficient amount of the liquid food may not be let out by the second pressure reduction treatment, and consequently, in a case where, for example, a thick solid edible material is impregnated with a liquid food which solidifies at room temperature, the texture thereof may become too hard. To cope with the above, if various recipe modifications are made to decrease the viscosity of a liquid food, an aimed amount of the liquid food may let out, but the taste of the liquid food may become dull, which is not favorable. Additionally, it also has a disadvantage that the steps become complicated because it is necessary to carry out the pressure reduction treatment twice.

CITATION LIST

Patent Literature

[Patent Literature 1] WO 97/47207
[Patent Literature 2] JP 10-150917
[Patent Literature 3] JP 2001-238612
[Patent Literature 4] JP 2008-5745

SUMMARY OF INVENTION

Technical Problem

In view of this, an object of the present invention is to provide an impregnated food in which the taste of a liquid food impregnated into a solid edible material is good, and at the same time the texture of the impregnated food is not hard, as well as a sense of unity between the solid edible material and the liquid food is attained, and to provide a process for producing the same.

Solution to Problem

To solve the problem, the present inventors studied intensively, and found that an impregnated food in which a liquid food with a relatively high viscosity is impregnated deep into the central part of a solid edible material and which moderately has voids therein possesses a pleasing taste of the impregnated liquid food, presents a texture of not too hard at the same time, and achieves a sense of unity between the solid edible material and the liquid food.

Further, the present inventors found that even if the viscosity of a liquid food is relatively high, it is possible to obtain an impregnated food moderately having voids in the solid edible material and presenting a pleasant texture by pressurizing in a state where the liquid food is in contact with a solid edible material so as to impregnate once the liquid food deep into the central part of the solid edible material, and then by reducing the pressure so as to let out the liquid food once impregnated deep into the central part of the solid edible material by means of expansion force of the compressed air in the central part of the solid edible material, thereby accomplishing the present invention.

The present invention is constituted by the followings:
(1) An impregnated food in which a solid edible material is impregnated with a liquid food having a viscosity of 10,000 to 100,000 mPa·s at 35° C.
(2) The impregnated food according to the above (1), wherein the proportion of the weight of the liquid food impregnated into the solid edible material is 40 to 80% with respect to the entire weight of the impregnated food.
(3) The impregnated food according to the above (1) or (2), wherein the solid edible material is a baked confectionery, a puffed food or a freeze-dried food.
(4) The impregnated food according to any one of the above (1) to (3), wherein the liquid food is chocolate.
(5) The impregnated food according to any one of the above (1) to (4), wherein on a cross-sectional plane, the proportion of the area of a part where the liquid food does not permeate is 8% or less with respect to the area of the entire cross-sectional plane.
(6) A process for producing an impregnated food, wherein in a hermetically closed system, the system is pressurized in a state where a solid edible material is made contact with a liquid food, and then the pressure in the system is returned to the atmospheric pressure.

(7) The process for producing an impregnated food according to the above (6), wherein after the pressure in the system is returned to the atmospheric pressure, the pressure in the system is reduced in a state where the solid edible material is not made contact with the liquid food, and then the pressure in the system is returned to the atmospheric pressure.

(8) The process for producing an impregnated food according to the above (6) or (7), wherein a maximum pressure during the pressurization is an absolute pressure of 200 kPa to 10,130 kPa.

(9) The process for producing an impregnated food according to the above (7) or (8), wherein a minimum pressure during the depressurization is an absolute pressure of 2 to 101 kPa.

(10) An impregnated food in which a solid edible material is impregnated with a liquid food, wherein the inside of the solid edible material is impregnated with the liquid food having a viscosity of 10,000 to 100,000 mPa·s at 35° C. by pressurizing in a state where the solid edible material is made contact with the liquid food, and then, voids are formed inside the solid edible material by returning the pressure to the atmospheric pressure to let out part of the liquid food impregnated into the inside of the solid edible material.

(11) The impregnated food according to the above (10), wherein the solid edible material is a baked confectionery or a puffed food, the liquid food is chocolate, and the voidage of the solid edible material impregnated with the liquid food is 10 to 20%.

(12) A method for impregnating a solid edible material with a liquid food, wherein the inside of the solid edible material is impregnated with the liquid food having a viscosity of 10,000 to 100,000 mPa·s at 35° C. in a hermetically closed system by pressurizing the system in a state where the solid edible material is made contact with the liquid food, and then, voids are formed inside the solid edible material by returning the pressure in the system to the atmospheric pressure to let out part of the liquid food impregnated into the inside of the solid edible material.

Advantageous Effects of Invention

According to an impregnated food of the present invention, since a liquid food with a relatively high viscosity is impregnated deep into the central part of a solid edible material, the taste of the impregnated liquid food is rich. Further, according to a preferable embodiment of an impregnated food of the present invention, the impregnated food further has voids inside moderately, thereby resulting in that the texture thereof is not hard even if it is thick, and a sense of unity between the solid edible material and the liquid food can be attained.

Furthermore, according to a process for producing an impregnated food according to the present invention, it is possible to obtain an impregnated food in which the liquid food with a relatively high viscosity is impregnated deep into the central part of a solid edible material and which has voids inside moderately.

DESCRIPTION OF EMBODIMENTS

Figure 1:
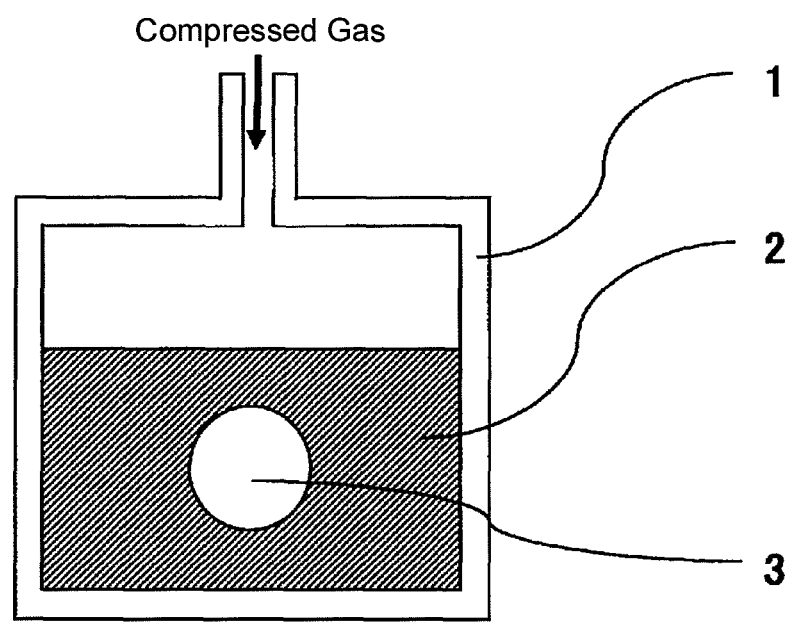
FIG. 1 shows a schematic diagram of a pressurization treatment method in which a compressed gas is fed into a headspace in a hermetically closed system.

In the present invention, there is no particular restriction on the solid edible material insofar as the food is porous and has voids therein. Examples thereof include freeze-dried products of fruits, vegetables, sea foods, meats, eggs, molded foods (molded mixture of various raw materials), and the like; various puffed foods, such as puffed snack foods produced by deep-frying with oil, by puffing pellets with hot air, or by cooking and puffing a raw material by an extruder; and baked confectioneries, such as rice crackers (senbei), small rice crackers (arare), millet-and-rice cakes (okoshi), small sugar-coated cookies (karintou), wafers, croutons, meringues, biscuits, pies, cookies, and sponge cakes. Other examples include breads such as white bread and French bread, doughnuts, waffles, freeze-dried tofu, and dried wheat gluten (fu).

Examples of the liquid food to be impregnated into the solid edible material according to the present invention include any and all liquid edible materials which are fluent at impregnation regardless of its form, such as a liquid, a solution, a slurry, a dispersion, an oil system, a water system, and an emulsion. For example, the liquid food may be solidified in the impregnated food. Consequently, examples of the liquid food include materials which are solid at ordinary temperature but become liquid by adjusting the temperature so as to be usable for an impregnation treatment, such as butter, margarine, chocolate, gummi candies, and candies.

Examples of the liquid food to be impregnated into the solid edible material include edible oils and fats, such as olive oil, cooking oil, butter, and margarine; slurries or oil-based creams, in which solids (e.g., sugar, cacao mass, tea leaves, powdered milk, freeze-dried foods, dried cheeses, various dried powders, and various spices) are dispersed in oils and fats; starch syrups made from various saccharides and solutions thereof in which various thickening polysaccharides (such as agar, carrageenan, guar gum, xanthan gum, tamarind gum, and pectin) are dissolved; fermented seasonings, such as soy sauce and miso; food extracts, such as coffee and tea extracts; alcoholic beverages, such as brandy, rum, distilled liquors, and liqueurs; beverages, such as nectars, juices, soups, milk, and cocoa; condensed milk; yogurts; and fresh cream.

The present invention is effective for those having a relatively high viscosity of 10,000 to 100,000 mPa·s at an impregnation treatment, and especially effective for those having a high viscosity of preferably 50,000 to 100,000 mPa·s at an impregnation treatment among the above listed liquid foods. The advantageous features of the present invention become clearer with a high-viscosity liquid food. In the case of chocolate, the viscosity at 35° C. is 10,000 to 100,000 mPa·s is preferable, since the taste become rich.

The viscosity herein means a viscosity measured by a single cylinder rotational viscometer (Brookfield-type viscometer).

A value of a pressure (kPa) herein means an absolute pressure value, which is a sum of an environmental pressure such as the atmospheric pressure and a pressure intentionally added. The pressure measurement herein is conducted in an environment of 1 atm. In an environment at 1 atm, if no pressure is intentionally added, the pressure value is 101 kPa.

The term chocolate is used herein in a broad sense, and not restricted by the "Fair Competition Code for Proper Labeling of Chocolate Products" certified by the Japan Fair Trade Commission. Namely, it is a food suspending an edible component, such as a cocoa powder, a finely-milled powder of saccharides or milk solids, in a matrix consisting of a continuous phase of an edible oil and fat solidifying at a certain temperature or below, and optionally various emulsifiers, additives, flavors, etc. may be added. Typical Examples include sweet chocolate, milk chocolate and white chocolate. Furthermore, the edible oil and fat is not limited to cocoa butter, and chocolate using as cocoa butter equivalents an oils and fats, such as tempering oils or a non-tempering oils derived from animals or plants, or also a mixture of the equivalents and cocoa butter, is included in the chocolate according to the present invention.

(Production Process)

A process for producing an impregnated food according to the present invention is characterized in that in a hermetically closed system, the system is pressurized in a state where a solid edible material is made contact with a liquid food, and then the pressure in the system is returned to the atmospheric pressure. The contact includes a partial contact, but is preferably an entire contact.

The impregnated food according to the present invention can be obtained, for example, in such a manner that the pressure is increased in a state where the solid edible material is completely immersed in the liquid food and the pressurized state is maintained for a certain period (step 1), and then the pressure is returned to the atmospheric pressure (step 2). Further, as needed, after returned to the atmospheric pressure, the pressure may be further reduced without immersing the solid edible material in a liquid food (step 3), and then returned to the atmospheric pressure again (step 4). Each step will be described in more detail below.

(Step 1)

At the first pressurization treatment, it is not necessary that the solid edible material be completely immersed in a liquid food, but if part of the solid edible material is not immersed in the liquid food, the liquid food is not sufficiently impregnated into that part. In view of this, it is preferable that the treatment is carried out in a state in which the solid edible material is completely immersed in the liquid food.

Figure 2:
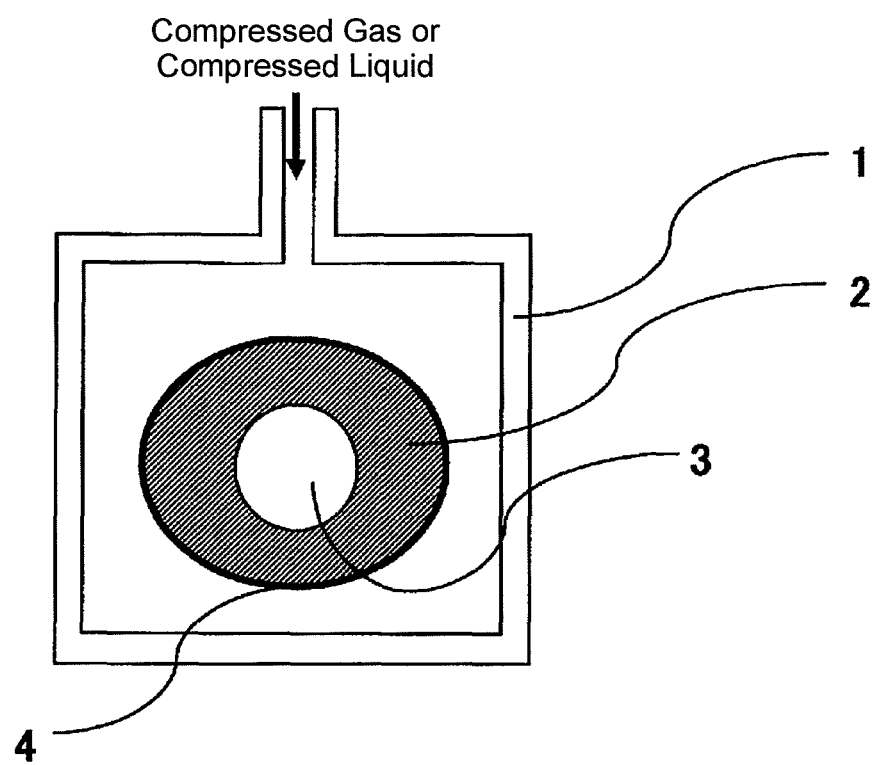
FIG. 2 shows a schematic diagram of a method in which a solid edible material and a liquid food are placed in a deformable hermetically-closed container, and the deformable container is pressurized from its surroundings by a compressed gas or a compressed liquid.
Figure 3:
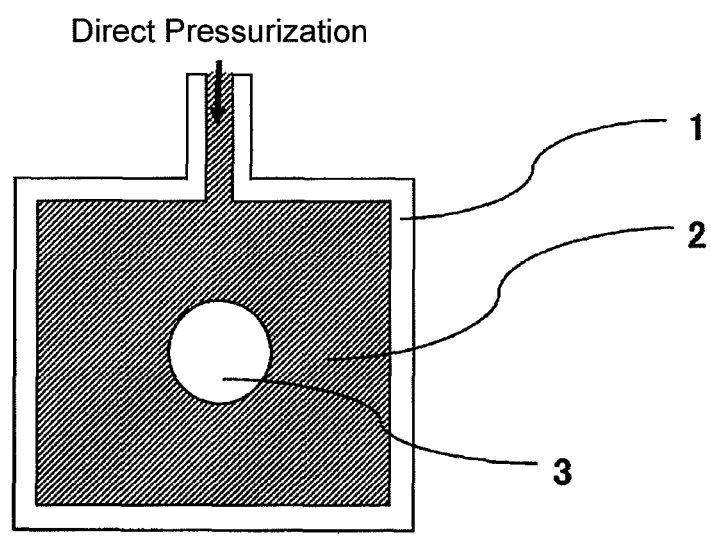
FIG. 3 shows a schematic diagram of a method in which a liquid food in which a solid edible material is immersed is pressurized directly.

There is no particular restriction on a pressurization method, insofar as the liquid food can be pressurized. As a pressurization treatment, for example, any of a method in which a compressed gas is fed into a headspace in a hermetically closed system (FIG. 1), a method in which a solid edible material and a liquid food are placed in a deformable hermetically closed container, and the deformable container is pressurized from the surroundings by a compressed gas or a compressed liquid (FIG. 2), and a method in which a liquid food in which a solid edible material is immersed is pressurized directly (FIG. 3), may be carried out.

By the pressurization treatment the liquid food is impregnated from the surface of the solid edible material inward toward the center, and at the same time air originally existing in the solid edible material is compressed inward toward the central part. The higher the pressure applied to the liquid food, the closer to the center of the solid edible material the liquid food can be impregnated. In a case where the viscosity of the liquid food is high, the texture of the solid edible material is compact, or the volume of the solid edible material is large, it tends to become difficult to impregnate the liquid food close to the center of the solid edible material. It is, however, possible by intensifying appropriately the pressurization to impregnate the liquid food close to the center. The maximum pressure during the pressurization is preferably an absolute pressure of 200 kPa to 10,130 kPa and may be selected according to a combination of the solid edible material and the liquid food.

On the other hand, in a conventional method of impregnating the liquid food by pressure reduction, even if the pressure is reduced close to the absolute vacuum, only a differential pressure of 101.3 kPa is produced at a maximum, and consequently under such difficult conditions for impregnation as described above, impregnation close to the center may occasionally not be possible.

At the step 1, as soon as a predetermined pressure is reached, the step 2 may be initiated; or after a predetermined pressure is maintained for a certain period of time, the step 2 may be initiated.

(Step 2)

The step of returning the pressure to the atmospheric pressure after pressurization is carried out by releasing the pressure, in a case where the pressurization is carried out by means of a compressed gas or a compressed liquid. Furthermore, in a case where the liquid food is pressurized directly by a pressing body, the step of returning the pressure to the atmospheric pressure is carried out by releasing the pressure of the pressing body. The step of returning the pressure to the atmospheric pressure may be carried out in a state where the solid edible material is immersed in a liquid food, or in a state where the solid edible material is out of contact with the liquid food. In either cases, the air compressed close to the center of the solid edible material expands when returning to the atmospheric pressure, thereby letting out part of the impregnated liquid food. Through the above, an impregnated food having moderate voids inside the solid edible material can be obtained. The expanding force of the air compressed in the central part of the solid edible material increases in response to the intensity of the compression. In a case where the viscosity of the liquid food is high, the texture of the solid edible material is compact, or the volume of the solid edible material is large, it tends to become difficult to let out the liquid food, but it is still possible to let out the liquid food by intensifying the pressurization. In this connection, as for a speed of returning to the atmospheric pressure, in a case where the pressure is returned from the pressurized state to the atmospheric pressure too rapidly, the solid edible material may be broken, and therefore, the speed must be controlled appropriately. Furthermore, according to a method in which the liquid food is let out by carrying out pressure reduction twice (Patent Literature 4), even if the pressure is reduced close to the absolute vacuum, only a differential pressure of 101.3 kPa is produced at a maximum. Consequently, under such difficult conditions for extrusion as described above, the liquid food cannot be let out sufficiently.

(Step 3)

Following the step 2, the pressure may be reduced, as needed, to an absolute pressure of 2 to 101 kPa without immersing the solid edible material in the liquid food.

Therethrough, the air existing in the voids generated in the step 2 expands so that the liquid food in the solid edible material can be let out further. By regulating the degree of the pressure reduction, the amount of the liquid food to be let out can be controlled so as to control the finishing texture and taste.

(Step 4)

Then, the pressure is returned to the atmospheric pressure again, so that the impregnated food having more voids than at the completion of the step 2 can be obtained.

The production process according to the present invention is characterized in that the pressurization is carried out in the first step. There is a method in which the pressure reduction is carried out first and then the pressurization is carried out. In this case, with respect to the liquid food having a high solidifying temperature, the temperature during the impregnation procedure may not be set at a lower level. Therefore, in a case where the liquid food which boils during the pressure reduction is utilized and the pressure reduction is carried out first, foaming takes place and impregnation cannot be performed well. In contrast, the process according to the present invention will not cause such a problem. Further, in the production process according to the present invention, in a case where the pressure reduction treatment is not carried out, dissipation of low-boiling flavor components can be suppressed.

The impregnated food obtained by the afore-described procedures may be cooled down to solidify the impregnated liquid food. Further, as needed, additional processing, such as coating and topping, may be carried out according to known methods.

The impregnated food in which the solid edible material is impregnated with the liquid food, according to another embodiment of the present invention is characterized in that the inside of the solid edible material is impregnated with the liquid food having a viscosity of 10,000 to 100,000 mPa·s at 35° C. by pressurizing in a state where the solid edible material is made contact with the liquid food, and then, voids are formed inside the solid edible material by returning the pressure to the atmospheric pressure to let out part of the liquid food impregnated into the inside of the solid edible material. By forming moderate voids, a comfortable texture can be attained. For the above impregnated food, it is preferable that the solid edible material is a baked confectionery or a puffed food, the liquid food is chocolate, and the voidage of a solid edible material impregnated with the liquid food is 10 to 20%. The voidage is more preferably 15 to 20%. In a case where the solid edible material is a baked confectionery or a puffed food and the liquid food is chocolate, when the voidage is within the above range, a comfortable texture can be obtained.

A method for impregnating a solid edible material with a liquid food, according to the present invention, is characterized in that the inside of the solid edible material is impregnated with the liquid food having a viscosity of 10,000 to 100,000 mPa·s at 35° C. in a hermetically closed system by pressurizing the system in a state where the solid edible material is made contact with the liquid food, and then, voids are formed inside the solid edible material by returning the pressure in the system to the atmospheric pressure to let out part of the liquid food impregnated into the inside of the solid edible material. As described above, even the liquid food having a viscosity of 10,000 to 100,000 mPa·s can be impregnated close to the center of the solid edible material by the pressurization treatment. Further, by a subsequent returning treatment to the atmospheric pressure, part of the impregnated liquid food is let out so that the impregnated food having moderate voids inside the solid edible material can be obtained.

(Measuring Methods)

On any cross-sectional plane of the impregnated food according to the present invention, it is preferable that the proportion of the area of a part where a liquid food does not permeate (an unreached part), with respect to the area of the entire cross-sectional plane, is 8% or less, in order to attain a sense of unity between the solid edible material and the liquid food. A measuring method for the area of the part where the liquid food does not permeate (the unreached part) follows Test Example 1.

Although the proportion of the weight of the impregnated liquid food in the weight of the entire impregnated food according to the present invention varies to some extent depending on the specific gravity of the liquid food, the bulk specific gravity of the solid edible material, etc., in a case where it is 40 to 80% especially when chocolate or oil-based cream is impregnated in a baked confectionery, a puffed snack food, or a freeze-dried product, the features of both the solid edible material and the liquid food can be exploited, thereby advantageously yielding a food with a comfortable texture and taste. A measuring method for the weight proportion of the liquid food in the impregnated food follows Test Example 2.

Measurement of the viscosity in the present invention is carried out by a Brookfield-type viscometer using a rotor No. 6, at a measuring rotation speed of 4 rpm.

The measuring method for the voidage in the food in the present invention follows Test Example 3.

The measuring method for the breaking strength in the present invention follows Test Example 4.

EXAMPLES

The present invention will be described in more detail below referring to Examples, but the present invention is not limited thereto.

Example 1

Baked Confectionery Preparation Step

A liquid seed dough was obtained by well mixing 230 parts by weight of chicken eggs, 170 parts by weight of sugar, 90 parts by weight of an emulsified oil and fat, 3 parts by weight of an emulsifier, 150 parts by weight of water, 300 parts by weight of cake flour, and 30 parts by weight of an oil and fat. The dough was flowed into a metal mold and baked in an oven at 180° C. for 20 min, and further dried at 100° C. for 1 hour to obtain baked confectioneries in a size of 15 mm×10 mm×50 mm.

(Chocolate Material Preparation Step)

A chocolate material was prepared by a conventional method with the formulation of 190 parts by weight of cacao mass, 370 parts by weight of sugar, 160 parts by weight of powdered milk, 280 parts by weight of cocoa butter, and 5 parts by weight of an emulsifier. The viscosity of the chocolate material at 35° C. was 15,000 mPa·s (Brookfield-type viscometer, No. 6 rotor, 4 rpm). The temperature of 100 parts by weight of the chocolate material was adjusted to 35° C., and 3 parts by weight of Chocoseed B (produced by Fuji Oil Co., Ltd.) was mixed therein.

(Impregnation Step)

In the chocolate material maintained at 35° C., the baked confectioneries were immersed, and placed in a hermetically closed container. After compressed air was fed to a space in the hermetically closed container so as to increase the pressure to an absolute pressure of 301 kPa, the pressure was kept for 10 sec and then reduced to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with the chocolate material.

Example 2

Except that the pressurizing condition was set at an absolute pressure of 501 kPa, baked confectioneries impregnated with a chocolate material were obtained in the same manner as in Example 1.

Except that the pressurizing condition was set at an absolute pressure of 701 kPa, baked confectioneries impregnated with a chocolate material were obtained in the same manner as in Example 1.

Comparative Example 1

With the use of the same baked confectioneries and chocolate material as in Example 1, the temperature of 100 parts by weight of the chocolate material was adjusted to 35° C., and 3 parts by weight of Chocoseed B (produced by Fuji Oil Co., Ltd.) was mixed similarly. While the chocolate material was maintained at 35° C., the baked confectioneries were immersed therein, they were placed in a hermetically closed container, and the air in the hermetically closed container was evacuated by a vacuum pump to reduce the pressure to an absolute pressure of 11 kPa, which was then returned to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with a chocolate material.

Test Example 1

Ten impregnated objects finally obtained each in Examples 1 to 3 and Comparative Example 1, were cut in half at the middle on a plane, and their cross-sections were photographed by a digital camera. Then, from each image, using the image processing software of ImageJ (Sun Microsystems, Inc.), the area of a part where chocolate did not reach was measured by means of color difference, and the proportion of the area with respect to an entire cross-sectional area was calculated (Table 1). According to a comparison among Examples 1 to 3, the greater the pressurization was, the smaller the size of the part where the chocolate material did not reach became. Further, in Example 3 and Comparative Example 1, the areas of the parts where the chocolate material did not reach were small to almost the same extent.

Test Example 2

In Examples 1 to 3 and Comparative Example 1, the weight of the baked confectioneries before impregnation and the weight of each of 10 impregnated objects after impregnation, were measured, and the proportion of the weight of the impregnated chocolate material with respect to the weight of the impregnated object was calculated. According to a comparison among Examples 1 to 3, the greater the pressurization was, the more the chocolate material was impregnated. Further, according to a comparison between Example 3 and Comparative Example 1, although the areas where the chocolate material did not reach were almost the same between Example 3 and Comparative Example 1, the chocolate material was more impregnated in Comparative Example 1 (Table 1).

Test Example 3

To examine the voidage in Example 3 and Comparative Example 1, the following test was conducted. Initially, the volume of an impregnated object was measured by immersing completely the impregnated object in a measuring cylinder containing cooking oil. The impregnated object was pulled out from the cooking oil, the cooking oil attached around the impregnated object was wiped off thoroughly by tissue, and the impregnated object was finely ground in a mortar. The resultant was placed in a measuring cylinder containing cooking oil and the pressure was reduced (after reaching an absolute pressure of 8 kPa, the pressure was maintained for 1 min, and then returned to the atmospheric pressure) so as to degas small air bubbles. Then the volume of the impregnated object excluding voids was measured, and finally the voidage with respect to the entire volume of the impregnated object was calculated. The voidage value is a mean value of 10 impregnated objects. The voidage of Example 3 was larger than that of Comparative Example 1 (Table 1)

Test Example 4

The breaking strength of an impregnated object obtained in Examples 1 to 3, and Comparative Example 1 was measured. Using a rheometer (FUDOH RTC-3010D-CW, by Rheotech), holders were placed on a table at intervals of 8 mm, and impregnated objects were placed thereon. The table was raised at a rate of 2 cm/min, so that a plunger with a tool angle of 40° hit the impregnated objects from above at the middle parts in a longitudinal direction thereof, thereby measuring their maximum stresses exerted thereon until breakage. The measured value is a mean value of 10 impregnated objects. From a comparison among Examples 1 to 3, the greater the pressurization was, the higher the breaking strength was. Further, the breaking strength of Comparative Example 1 was higher than that of Example 3 (Table 1).

TABLE 1

| | Proportion of area of part where chocolate did not reach (%) | Proportion of chocolate (%) | Voidage (%) | Breaking strength (kgw) |
|---|---|---|---|---|
| Example 1 | 26.2 | 62.4 | — | 3.06 |
| Example 2 | 18.4 | 64.8 | — | 3.35 |
| Example 3 | 9.2 | 66.6 | 16.0 | 3.54 |
| Comparative Example 1 | 9.0 | 71.1 | 6.2 | 3.86 |

As described above, by increasing the pressure in the pressurization treatment, chocolate could permeate close to the center of the baked confectionery. Furthermore, it was found that, as compared to the baked confectionery into which chocolate was impregnated to a similar extent by means of the pressure reduction treatment, the one obtained by the pressurization treatment had a lower weight proportion of chocolate and a higher voidage, and therefore the texture thereof was less hard.

Example 4

In a similar manner to the baked confectionery preparation step according to Example 1, baked confectioneries in a size of 30 mm×20 mm×150 mm were prepared.

A chocolate material was prepared by a conventional method with the formulation of 200 parts by weight of cacao mass, 420 parts by weight of sugar, 200 parts by weight of powdered milk, 170 parts by weight of cocoa butter, and 5 parts by weight of an emulsifier. The viscosity of the chocolate material at 35° C. was 55,000 mPa·s (Brookfield-type viscometer, No. 6 rotor, 4 rpm).

The temperature of 100 parts by weight of the chocolate material was adjusted to 35° C., and 3 parts by weight of Chocoseed B (produced by Fuji Oil Co., Ltd.) was mixed. While the chocolate material was maintained at 35° C., the baked confectioneries were immersed therein, and they were placed in a hermetically closed container. After compressed air was fed to a space in the hermetically closed container to increase the pressure to an absolute pressure of 701 kPa, the pressure was maintained for 10 sec and then reduced to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with a chocolate material.

Example 5

Except that the pressurizing condition was set at an absolute pressure of 2,701 kPa, baked confectioneries impregnated with a chocolate material were obtained in the same manner as in Example 4.

Example 6

After the baked confectioneries were taken out from the chocolate material and the chocolate material attached around the baked confectioneries was wiped off thoroughly pursuant to Example 5, but before the baked confectioneries were cooled down to 15° C., only the baked confectioneries were again placed in the hermetically closed container, and the air in the hermetically closed container was evacuated by a vacuum pump to reduce the pressure to an absolute pressure of 15 kPa, which was then returned to the atmospheric pressure. Thereafter, the baked confectioneries were taken out from the chocolate material, the chocolate material attached around the baked confectioneries was wiped off thoroughly, and the baked confectioneries were cooled to 15° C. to solidify the chocolate to obtain baked confectioneries impregnated with a chocolate material.

Comparative Example 2

The temperature of 100 parts by weight of the same chocolate material as in Example 4 was adjusted to 35° C., and 3 parts by weight of Chocoseed B (produced by Fuji Oil Co., Ltd.) was mixed. While the chocolate material was maintained at 35° C., the same baked confectioneries as in Example 4 were immersed therein, they were placed in a hermetically closed container, and the air in the hermetically closed container was evacuated by a vacuum pump to reduce the pressure to an absolute pressure of 15 kPa (the first reduced pressure), which was then returned to the atmospheric pressure. Thereafter, the baked confectioneries were taken out from the chocolate material, only the baked confectioneries were placed again in the hermetically closed container, and the air in the hermetically closed container was evacuated by a vacuum pump to reduce the pressure to an absolute pressure of 4 kPa (the second reduced pressure), which was then returned to the atmospheric pressure. Thereafter, the chocolate material attached around the baked confectioneries was wiped off thoroughly, and the baked confectioneries were cooled to 15° C. to solidify the chocolate to obtain baked confectioneries impregnated with a chocolate material.

Comparative Example 3

Except that the first reduced pressure was set at an absolute pressure of 9 kPa, baked confectioneries impregnated with a chocolate material were obtained in the same manner as in Comparative Example 2.

Comparative Example 4

Except that the first reduced pressure was set at an absolute pressure of 4 kPa, baked confectioneries impregnated with a chocolate material were obtained in the same manner as in Comparative Example 2.

Comparative Example 5

A chocolate material was prepared by a conventional method with the formulation of 170 parts by weight of cacao mass, 320 parts by weight of sugar, 140 parts by weight of powdered milk, 370 parts by weight of cocoa butter, and 5 parts by weight of an emulsifier. The viscosity of the chocolate material at 35° C. was 6,300 mPa·s (Brookfield-type viscometer, No. 6 rotor, 4 rpm).

Then, 100 parts by weight of the chocolate material was adjusted to 35° C., 3 parts by weight of Chocoseed B (produced by Fuji Oil Co., Ltd.) was mixed therein. While the chocolate material was maintained at 35° C., the same baked confectioneries as in Example 4 were immersed therein, and they were placed in a hermetically closed container. The air in the hermetically closed container was evacuated by a vacuum pump to reduce the pressure to an absolute pressure of 8 kPa, which was then returned to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with a chocolate material.

Comparative Example 6

After the baked confectioneries were taken out from the chocolate material and the chocolate material attached around the baked confectioneries was wiped off thoroughly, pursuant to Comparative Example 5, but before the baked confectioneries were cooled down to 15° C., only the baked confectioneries were again placed in the hermetically closed container, and the air in the hermetically closed container was evacuated by a vacuum pump to reduce the pressure to an absolute pressure of 15 kPa (the second reduced pressure), which was then returned to the atmospheric pressure. Thereafter, the chocolate material attached around the baked confectioneries was wiped off thoroughly, and the baked confectioneries were cooled down to 15° C. to solidify the chocolate to obtain baked confectioneries impregnated with a chocolate material.

Test Example 5

Figure 4:
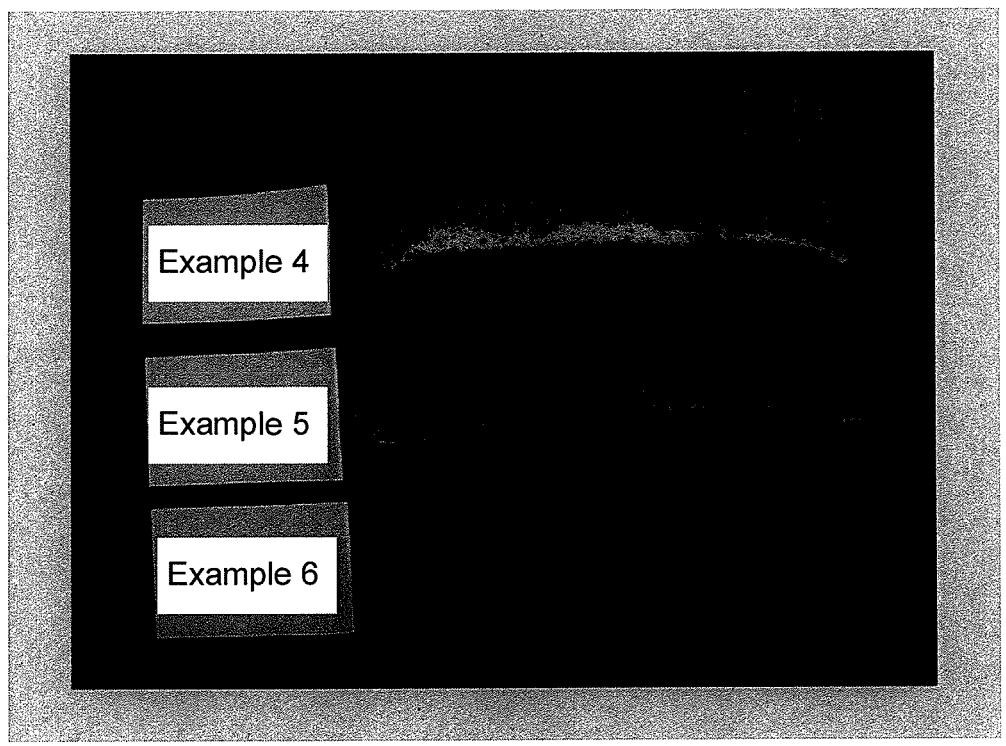
FIG. 4 shows cross-sectional photographs of impregnated foods according to Examples 4 to 6.
Figure 5:
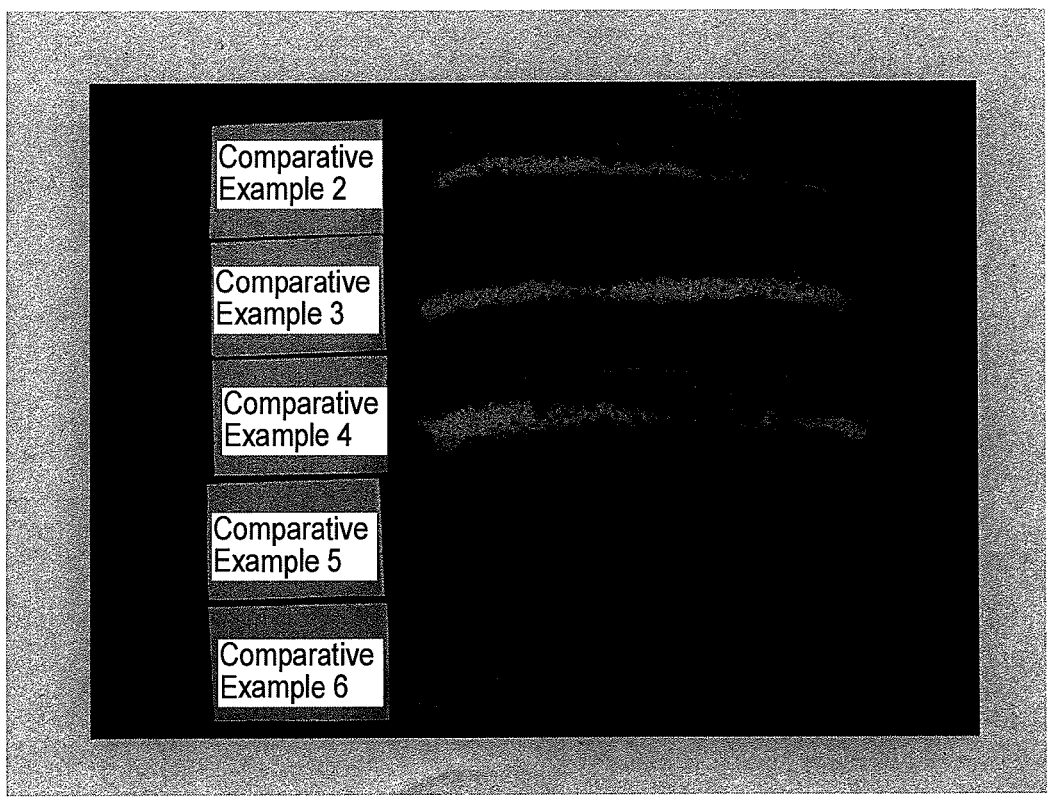
FIG. 5 shows cross-sectional photographs of impregnated foods according to Comparative Examples 2 to 6.

In Examples 4 to 6 and Comparative Examples 2 to 6, the proportion of the area of a part where chocolate did not reach with respect to the entire cross-sectional area was calculated (Table 2) in a similar manner to Test Example 1. Photographs of the cross-sections which were taken at that time are shown in FIGS. 4 and 5. Among Examples 4 to 6 and Comparative Examples 2 to 4, where the viscosity of the chocolate material was 55,000 mPa·s, a part where the chocolate material did not reach existed in Example 4, but in Examples 5 and 6, where the pressurizing condition was higher, such a part did not substantially exist. On the other hand, in Comparative Examples 2 to 4, where a pressure reduction treatment was carried out twice and the absolute pressure was reduced to a practical limit value, there existed, nevertheless, many parts where the chocolate material did not reach. Furthermore, in both Comparative Examples 5 and 6, where the viscosity of the chocolate material at 35° C. was 6,300 mPa·s, a part where the chocolate material did not reach did not substantially exist.

Test Example 6

In Examples 4 to 6, and Comparative Examples 2 to 6, the weight of baked confectioneries before impregnation and the weight of impregnated objects after impregnation were measured, and the proportion of the weight of the impregnated chocolate material with respect to the weight of the impregnated object was calculated therefrom.

According to a comparison between Examples 4 and 5, the greater the pressurization was, the more the chocolate material was impregnated.

Further, according to a comparison between Examples 5 and 6, in Example 6, where a pressure reduction treatment was conducted after a pressurization treatment, the chocolate material was let out more extensively and the weight proportion thereof was smaller.

As to Comparative Examples 5 and 6, where the viscosity of the chocolate material at 35° C. was 6,300 mPa·s, the chocolate material was impregnated in the largest amount in Comparative Example 5. In Comparative Example 6, the chocolate material was let out by the pressure reduction treatment after the procedures according to Comparative Example 5, so that the chocolate material remained impregnated to the same extent as in Example 5 (Table 2).

Test Example 7

The breaking strength of impregnated objects obtained in Examples 5 and 6, and Comparative Examples 5 and 6 was measured. The measurements were carried out in a similar manner to Test Example 4, except that the interval between the holders on the table was set to 40 mm.

In comparison of Example 5 with Example 6, the breaking strength of Example 6, where a pressure reduction treatment was carried out after a pressurization treatment, was lower. The breaking strength of Comparative Example 5, where the viscosity of the chocolate material was as low as 6,300 mPa·s and the impregnated amount of chocolate was the highest, was the highest. In Comparative Example 6, where the pressure reduction treatment was carried out after the procedures according to Comparative Example 5, the impregnated amount was equivalent to Example 5, and the breaking strength was equivalent to Example 5, too (Table 2).

Test Example 8

With respect to impregnated objects of Example 5 and Comparative Example 6 with similar impregnated amounts of chocolate and similar breaking strengths, 5 expert panelists on chocolate were asked about "which has a stronger chocolate taste?" and "which is more delicious?" for examination purpose. The following result was obtained at a preference rate of 100% that Example 5 had a stronger chocolate taste and was more delicious (Table 2).

Test Examples 5 to 8 can be summarized that, in a case where the viscosity of a chocolate material is as high as 55,000 mPa·s, an impregnation method with pressurization at a high pressure as in Examples 5 and 6 is more favorable than a conventional impregnation method by pressure reduction, in order to impregnate chocolate close to the central part of a baked confectionery. Further, by carrying out additionally a pressure reduction treatment after a pressurization treatment as in Example 6, the weight proportion of the chocolate and the breaking strength can be adjusted, so as to control the qualities, such as taste or hardness.

On the other hand, in a case where the viscosity of chocolate is as low as 6,300 mPa·s, chocolate can be impregnated close to the central part of a baked confectionery according to Comparative Example 5, which employs a conventional pressure reduction method, but the weight proportion of the chocolate with respect to the entire weight is high and therefore the breaking strength is high and gives a hard texture. According to Comparative Example 6, in which a pressure reduction treatment, though it is a conventional pressure reduction treatment, was carried out twice, a product having the proportion of chocolate and the breaking strength equivalent to Example 5 could be produced, but its quality was such that the taste of chocolate was weak and the deliciousness was inferior.

TABLE 2

| | Proportion of area of part where chocolate did not reach (%) | Proportion of chocolate (%) | Breaking strength (kgw) | Preference rate about chocolate taste | Preference rate about deliciousness |
|---|---|---|---|---|---|
| Example 4 | 17.2 | 68.7 | — | — | — |
| Example 5 | 1.5 | 69.5 | 8.61 | 100% | 100% |
| Example 6 | 1.6 | 68.3 | 7.43 | — | — |
| Comparative Example 2 | 14.8 | 67.4 | — | — | — |
| Comparative Example 3 | 38.2 | 65.9 | — | — | — |
| Comparative Example 4 | 20.4 | 70.1 | — | — | — |
| Comparative Example 5 | 1.1 | 71.9 | 9.75 | — | — |
| Comparative Example 6 | 0.9 | 69.4 | 8.21 | 0% | 0% |

Example 7

A chocolate material was prepared by a conventional method with the formulation of 280 parts by weight of powdered milk, 340 parts by weight of sugar, 370 parts by weight of cocoa butter, and 7 parts by weight of an emulsifier. The viscosity of the chocolate material at 35° C. was 13,500 mPa·s (Brookfield-type viscometer, No. 6 rotor, 4 rpm).

The temperature of 100 parts by weight of the chocolate material was adjusted to 35° C., and 3 parts by weight of Chocoseed B (produced by Fuji Oil Co., Ltd.) was mixed. In the chocolate material maintained at 35° C., freeze-dried whole strawberries were immersed, and they were placed in a hermetically closed container. After compressed air was fed to a space in the hermetically closed container to increase the pressure to an absolute pressure of 701 kPa, the pressure was maintained for 10 sec, and then reduced to the atmospheric pressure. Thereafter, the freeze-dried strawberries were taken out from the chocolate material, the chocolate material attached around them was wiped off thoroughly, and then the freeze-dried strawberries were cooled down to 15° C. to solidify the chocolate to obtain freeze-dried strawberries impregnated with a chocolate material.

Comparative Example 7

Using the same chocolate material and freeze-dried whole strawberries as in Example 7, the freeze-dried whole strawberries were immersed in the chocolate material prepared similarly, they were placed in a hermetically closed container, and the air in the hermetically closed container was evacuated by a vacuum pump to reduce the pressure to an absolute pressure of 11 kPa, which was then returned to the atmospheric pressure. Thereafter, the freeze-dried strawberries were taken out from the chocolate material, the chocolate material attached around them was wiped off thoroughly, and the freeze-dried strawberries were cooled down to 15° C. to solidify the chocolate to obtain freeze-dried strawberries impregnated with a chocolate material.

In impregnated objects obtained according to Example 7 and Comparative Example 7, the respective weight proportions of a chocolate material with respect to the entire object were 87% and 90%, and the weight proportion of chocolate was lower in Example 7 in which a pressurization treatment was carried out, but in Example 7, the chocolate material was impregnated closer to the center of the whole strawberry. Further, the one in Example 7 had a more pleasant texture.

Example 8

A chocolate material was prepared by a conventional method with the formulation of 340 parts by weight of cacao mass, 390 parts by weight of sugar, 65 parts by weight of powdered milk, 200 parts by weight of cocoa butter, and 8 parts by weight of an emulsifier. A ganache material was prepared by mixing, at 35° C., 690 parts by weight of the chocolate material, 280 parts by weight of fresh cream (milk fat content: 45%), and 30 parts by weight of Western liquor. The viscosity of the ganache material at 35° C. was 15,000 mPa·s (Brookfield-type viscometer, No. 6 rotor, 4 rpm).

The baked confectioneries of 15 mm×10 mm×50 mm used in Example 1 was placed in advance in a container, the ganache material was transported by a NEMO pump (produced by Heishin Ltd.) into the container to fill the container with the ganache material, thereby expelling completely under the atmospheric pressure the headspace air in the container. Thereafter, the transportation of the ganache material by the NEMO pump was further continued to increase the pressure of the ganache material in the container to an absolute pressure of 1,101 kPa, the pressure was maintained for 10 sec, and then the pressure in the container was released to the atmospheric pressure. Thereafter, the baked confectioneries were taken out from the ganache material, the ganache material attached around the baked confectioneries was wiped off thoroughly, and the baked confectioneries were cooled down to 15° C. for solidification to obtain baked confectioneries impregnated with a ganache material. Thus, an impregnated food in which the ganache with a rich taste was impregnated into its center and which moderately had voids was obtained. The weight proportion of the ganache with respect to the entire impregnated object obtained was 65.8%.

Example 9

A liquid seed dough was prepared by mixing well 230 parts by weight of chicken eggs, 170 parts by weight of sugar, 90 parts by weight of an emulsified oil and fat, 3 parts by weight of an emulsifier, 150 parts by weight of water, 300 parts by weight of cake flour, and 30 parts by weight of an oil and fat. The dough was flowed into a metal mold, baked in an oven at 180° C. for 20 min, and further dried at 100° C. for 1 hour to obtain baked confectioneries in a size of 15 mm×10 mm×50 mm.

A chocolate material was prepared by a conventional method with the formulation of 190 parts by weight of cacao mass, 370 parts by weight of sugar, 150 parts by weight of powdered milk, 290 parts by weight of cocoa butter, and 5 parts by weight of an emulsifier. The viscosity of the chocolate material at 35° C. was 13,000 mPa·s (Brookfield-type viscometer, No. 6 rotor, 4 rpm).

The temperature of 100 parts by weight of the chocolate material was adjusted to 35° C., and 3 parts by weight of Chocoseed B (produced by Fuji Oil Co., Ltd.) was mixed. While the chocolate material was maintained at 35° C., the baked confectioneries were immersed therein, and they were placed in a hermetically closed container. After compressed air was fed to a space in the hermetically closed container to increase the pressure to an absolute pressure of 701 kPa, the pressure was maintained for 10 sec, and then reduced to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with a chocolate material. The proportion of the area of a part where the chocolate material did not reach, with respect to the area of a cross-section of the obtained object, was 7.7%, which indicates that an impregnated food in which the chocolate material was impregnated into its center and which moderately had voids was obtained.

Example 10

In a similar manner to the baked confectionery preparation step of Example 1, baked confectioneries in a size of 30 mm×20 mm×150 mm were prepared.

A chocolate material was prepared by a conventional method with the formulation of 190 parts by weight of cacao mass, 370 parts by weight of sugar, 160 parts by weight of powdered milk, 280 parts by weight of cocoa butter, and 5 parts by weight of an emulsifier. The viscosity of the chocolate material at 35° C. was 15,000 mPa·s (Brookfield-type viscometer, No. 6 rotor, 4 rpm).

The temperature of 100 parts by weight of the chocolate material was adjusted to 35° C., and 3 parts by weight of Chocoseed B (produced by Fuji Oil Co., Ltd.) was mixed.

While the chocolate material was maintained at 35° C., the baked confectioneries were immersed therein, and they were placed in a hermetically closed container. After compressed air was fed to a space in the hermetically closed container to increase the pressure to an absolute pressure of 2,701 kPa, the pressure was maintained for 10 sec, and then reduced to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with a chocolate material. The proportion of the area of a part where the chocolate material did not reach, with respect to the area of a cross-section of the obtained object, was 0.9%, which indicated that an impregnated food in which the chocolate material was impregnated to its center and which moderately had voids was obtained.

Example 11

In a similar manner to the baked confectionery preparation step of Example 1, baked confectioneries in a size of 30 mm×20 mm×150 mm were prepared.

A chocolate material was prepared by a conventional method with the formulation of 225 parts by weight of cacao mass, 370 parts by weight of sugar, 265 parts by weight of powdered milk, 133 parts by weight of cocoa butter, and 7 parts by weight of an emulsifier. The viscosity of the chocolate material at 35° C. was 98,000 mPa·s (Brookfield-type viscometer, No. 6 rotor, 4 rpm).

The temperature of 100 parts by weight of the chocolate material was adjusted to 35° C., and 3 parts by weight of Chocoseed B (produced by Fuji Oil Co., Ltd.) was mixed. While the chocolate material was maintained at 35° C., the baked confectioneries were immersed therein, and they are placed in a pressure-resistant cylinder. After a piston was pushed in to expel the air existing in a space in the cylinder through a leak hole, the leak hole was closed, and the chocolate material was directly compressed by the piston to increase its pressure to 10,130 kPa. The pressure was maintained for 10 sec and then reduced to the atmospheric pressure. Thereafter, the baked confectioneries were taken out from the chocolate material, only the baked confectioneries were placed again in a hermetically closed container, and the air in the hermetically closed container was evacuated by a vacuum pump to reduce the pressure to an absolute pressure of 3 kPa, which was then returned to the atmospheric pressure. Thereafter, the chocolate material attached around the baked confectioneries was wiped off thoroughly, and the baked confectioneries were cooled down to 15° C. to solidify the chocolate to obtain baked confectioneries impregnate by the chocolate material. Thus, an impregnated food in which the chocolate material with a rich taste was impregnated to its center and which moderately had voids was obtained.

Example 12

A snack-food material, whose water content was adjusted to 15 weight % by adding 15 parts by weight of water to 85 parts by weight of corn grits, was charged to a feeding port of a single screw extruder (by Aoi Seiki Co., Ltd.) and cooked at a barrel temperature of 200° C. and a rotor rotation speed of 250 rpm. A puffed snack-food material was flowed out from the extruder, cut to an approximately cylindrical form in a size of 30 mm (base diameter)×100 mm (height), and dried down to a water content of 2 weight % to obtain puffed foods.

Further, a chocolate material was prepared by a conventional method with the formulation of 190 parts by weight of cacao mass, 370 parts by weight of sugar, 160 parts by weight of powdered milk, 280 parts by weight of cocoa butter, and 5 parts by weight of an emulsifier. The viscosity of the chocolate material at 35° C. was 15,000 mPa·s (Brookfield-type viscometer, No. 6 rotor, 4 rpm).

The temperature of 100 parts by weight of the chocolate material was adjusted to 35° C., and 3 parts by weight of Chocoseed B (by Fuji Oil Co., Ltd.) was mixed. While the chocolate material was maintained at 35° C., the baked confectioneries were immersed therein, and they were placed in a hermetically closed container. After compressed air was fed to a space in the hermetically closed container to increase the pressure to an absolute pressure of 201 kPa, the pressure was maintained for 10 sec, and then reduced to the atmospheric pressure. Thereafter, the baked confectioneries were taken out from the chocolate material, the chocolate material attached around the baked confectioneries was wiped off thoroughly, and the baked confectioneries were cooled down to 15° C. to solidify the chocolate to obtain baked confectioneries impregnated with a chocolate material. It was an impregnated food into which the chocolate material was impregnated and which moderately had voids.

REFERENCE SIGNS LIST

1: Hermetically closed container, 2: Liquid food, 3: Solid edible material, 4: Deformable hermetically closed container.

The invention claimed is:

1. A method for impregnating a solid edible material with a liquid food comprising:
    (a) contacting a solid edible material with a liquid chocolate in a hermetically closed system;
    (b) subjecting the hermetically closed system to a first pressurization treatment by pressurizing the hermetically closed system, wherein the pressure in the hermetically closed system is not reduced prior to the first pressurization treatment; and
    (c) returning the hermetically closed system to atmospheric pressure,
    wherein the liquid food has a viscosity of 10,000 to 100,000 mPa·s at 35° C.,
    wherein the liquid food is chocolate.

2. The method of claim 1, wherein the solid edible material is completely immersed in the liquid food prior to the first pressurization treatment.

3. The method of claim 1, wherein a maximum pressure during step (b) is an absolute pressure of 200 kPa to 10,130 kPa.

4. The method of claim 1, further comprising the following steps after the step (c):
    (d) subjecting the hermetically closed system to a pressure reduction step; and
    (e) returning the hermetically closed system to atmospheric pressure.

5. The method of claim 4, wherein the solid edible material is not immersed in the liquid food during the steps (d) and (e).

6. The method of claim 4, wherein a minimum pressure during the step (d) is an absolute pressure of 2 to 101 kPa.

7. The method of claim 1, wherein the first pressurization treatment comprises feeding a compressed gas into a headspace in the hermetically closed system.

8. The method of claim 1, wherein the first pressurization treatment comprises placing the solid edible material and the liquid food in a deformable hermetically closed container, pressurizing the deformable container from outside by a compressed gas or a compressed liquid.

9. The method of claim 1, wherein the first pressurization treatment is maintained for a predetermined period of time prior to depressurization.

10. The method of claim 1, wherein the solid edible material has a voidage of 10 to 20%.

11. The method of claim 10, wherein the solid edible material has a voidage of 15 to 20%.

12. The method of claim 1, wherein the solid edible material is a baked confectionery, a puffed food or a freeze-dried food.

13. The method of claim 1, wherein a proportion of weight of the liquid food impregnated into the solid edible material is 40 to 80% with respect to an entire weight of the impregnated food.

14. The method of claim 1, wherein on a cross-section plane, a proportion of an area of a part where the liquid food does not permeate is 8% or less with respect to an area of the entire cross-section plane.

15. The method of claim 1 wherein the solid edible material is a baked confectionery.

* * * * *